(12) United States Patent
Shirakawa

(10) Patent No.: US 7,107,770 B2
(45) Date of Patent: Sep. 19, 2006

(54) ENGINE CONTROL DEVICE

(75) Inventor: Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 2 days.

(21) Appl. No.: 11/035,100

(22) Filed: Jan. 14, 2005

(65) Prior Publication Data
US 2005/0188695 A1    Sep. 1, 2005

(30) Foreign Application Priority Data
Feb. 27, 2004    (JP) ............................. 2004-054515

(51) Int. Cl.
F02B 33/44    (2006.01)
F02B 47/08    (2006.01)
F02D 23/00    (2006.01)
F02M 25/07    (2006.01)
F01N 3/00    (2006.01)

(52) U.S. Cl. .................... 60/605.2; 60/601; 60/297; 60/280; 60/285; 123/568.11; 123/568.21; 123/305

(58) Field of Classification Search ............... 60/605.2, 60/297, 600–603, 280, 285; 123/568.11, 123/568.21, 568.14; 701/108, 104
See application file for complete search history.

(56) References Cited

U.S. PATENT DOCUMENTS

| 6,016,788 | A | * | 1/2000 | Kibe et al. ............. 123/568.21 |
| 6,035,640 | A | * | 3/2000 | Kolmanovsky et al. .... 60/605.2 |
| 6,581,372 | B1 | * | 6/2003 | Sasaki et al. ........... 123/568.11 |
| 6,606,981 | B1 | * | 8/2003 | Itoyama .................. 123/568.21 |
| 6,672,050 | B1 | * | 1/2004 | Murata et al. ................. 60/280 |
| 6,880,500 | B1 | * | 4/2005 | Verschoor .................. 60/605.2 |
| 2004/0244766 | A1 | * | 12/2004 | Fujieda et al. .............. 123/305 |
| 2005/0217649 | A1 | * | 10/2005 | Shimazaki et al. .... 123/568.14 |
| 2006/0016180 | A1 | * | 1/2006 | Tomita et al. ................. 60/297 |

FOREIGN PATENT DOCUMENTS

| DE | 102 37 416 A1 | 2/2004 |
| DE | 102 40 479 A1 | 3/2004 |
| EP | 1 004 760 A2 | 5/2000 |
| EP | 1 323 912 A1 | 7/2003 |
| JP | H06-69331 U | 9/1994 |
| JP | 2000-170588 A | 6/2000 |

* cited by examiner

Primary Examiner—Thai-Ba Trieu
(74) Attorney, Agent, or Firm—Global IP Counselors, LLP

(57) ABSTRACT

An engine control device is configured to prevent surging in an engine equipped with both a variable-nozzle turbocharger and an EGR device while curbing costs by utilizing existing equipment and avoiding undesirable secondary effects. When the engine is in a prescribed engine operating state in which the fuel injection quantity should be reduced, the EGR quantity delivered by the EGR device is reduced to a value lower than the normal value and the opening degree of the turbine nozzle of the turbocharger is increased. The prescribed engine operating state is defined to exist when the vehicle is decelerating and when the fuel injection quantity is decreased after regeneration of the NOx trapping catalytic converter.

19 Claims, 9 Drawing Sheets

ENGINE CONTROL DEVICE

CROSS-REFERENCE TO RELATED APPLICATIONS

This application claims priority to Japanese Patent Application No. 2004-054515. The entire disclosure of Japanese Patent Application No. 2004-054515 is hereby incorporated herein by reference.

BACKGROUND OF THE INVENTION

1. Field of the Invention

The present invention generally relates to a control device for an engine. More specifically, the present invention relates to technology for preventing surging in the turbocharger compressor of an engine equipped with a turbocharger and an EGR device.

2. Background Information

The idea of supercharging an engine using a turbo-supercharging device (turbocharger) comprising a turbine installed in an exhaust passage and driven by exhaust gas and a compressor installed in an air intake passage and driven by the turbine is well-known. When a turbocharger is used, there is a minimum allowable compressor flow rate that depends on the rotational speed of the turbine or the supercharging pressure. If the turbocharger is run with a compressor flow rate that is below the minimum allowable flow rate, a backflow of intake air moving in the upstream direction from downstream of the compressor will occur intermittently. This intermittent backflow is called "surging." Surging is known to occur when the fuel injection quantity decreases and the exhaust pressure declines. A conventional method of avoiding surging is to provide a bypass that links the upstream side of the compressor to the downstream side and arrange for the bypass to open when the fuel injection quantity decreases, thereby securing a compressor flow rate at least as large as the minimum allowable flow rate. One example of such a control method is disclosed in Japanese Laid-Open Patent Publication No. 06-069331 (See, paragraph 0005).

The idea of supercharging an engine by providing an intake air throttle valve in addition to a turbocharger is also well known. The intake air throttle valve can be driven independently of the accelerator depression amount and is configured to reduce the opening area of the air intake passage when it is driven in the close direction. In this kind of engine, when the fuel injection quantity decreases, the supercharging pressure is reduced by driving the intake air throttle valve in the close direction. One example of such a control method is disclosed in Japanese Laid-Open Patent Publication No. 2000-170588 (See, paragraph 0012).

Engines that are provided with both a turbocharger and an exhaust gas recirculation (hereinafter called "EGR") device for recirculating a portion of the exhaust gas to the air intake passage are also well known. The EGR device generally comprises an EGR passage linking the exhaust passage and air intake passage together and an EGR valve that is provided in the EGR passage and configured to control the flow rate of the recirculated exhaust gas.

In view of the above, it will be apparent to those skilled in the art from this disclosure that there exists a need for an improved engine control device. This invention addresses this need in the art as well as other needs, which will become apparent to those skilled in the art from this disclosure.

SUMMARY OF THE INVENTION

It has been discovered that in when the first related art described above is employed, special components must be added to the engine design in order to provide the bypass. The additional components inflate the cost of the engine and consume extra space, which is particularly troublesome in the case of passenger vehicles having little available space.

When the second related art described above is employed, the negative pressure inside the compressor increases when the air intake valve is driven in the close direction and lubricating oil leaks into the air intake passage from the compressor.

When the fuel injection quantity decreases, the exhaust pressure declines rapidly and the intake pressure declines in a delayed manner after the exhaust pressure declines. Thus, the exhaust pressure sometimes becomes temporarily lower than the intake pressure. If this occurs in an engine provided with an EGR device, there is the possibility that intake air will flow into the exhaust passage through the EGR passage if the EGR passage is left in its normal open state.

The present invention was contrived in view of the foregoing. One object of the present invention is to prevent surging in an engine equipped with both a turbocharger and an EGR device while curbing costs by utilizing existing equipment and avoiding undesirable secondary effects.

In order to achieve the above identified object and other objects of the present invention, an engine control device that basically comprises an engine operating state detecting section, an EGR quantity control section and a rotational speed control section. The engine operating state detecting section is configured to determine if an engine with a turbocharger is operating in a prescribed engine operating state resulting in a fuel injection quantity being reduced by at least a prescribed amount per unit time. The EGR quantity control section is configured to reduce an EGR quantity delivered by an EGR device to a quantity that is smaller than normal upon detecting the prescribed engine operating state. The rotational speed control section is configured to reduce a rotational speed of a turbine of the turbocharger to a speed that is lower than normal upon detecting the prescribed engine operating state.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
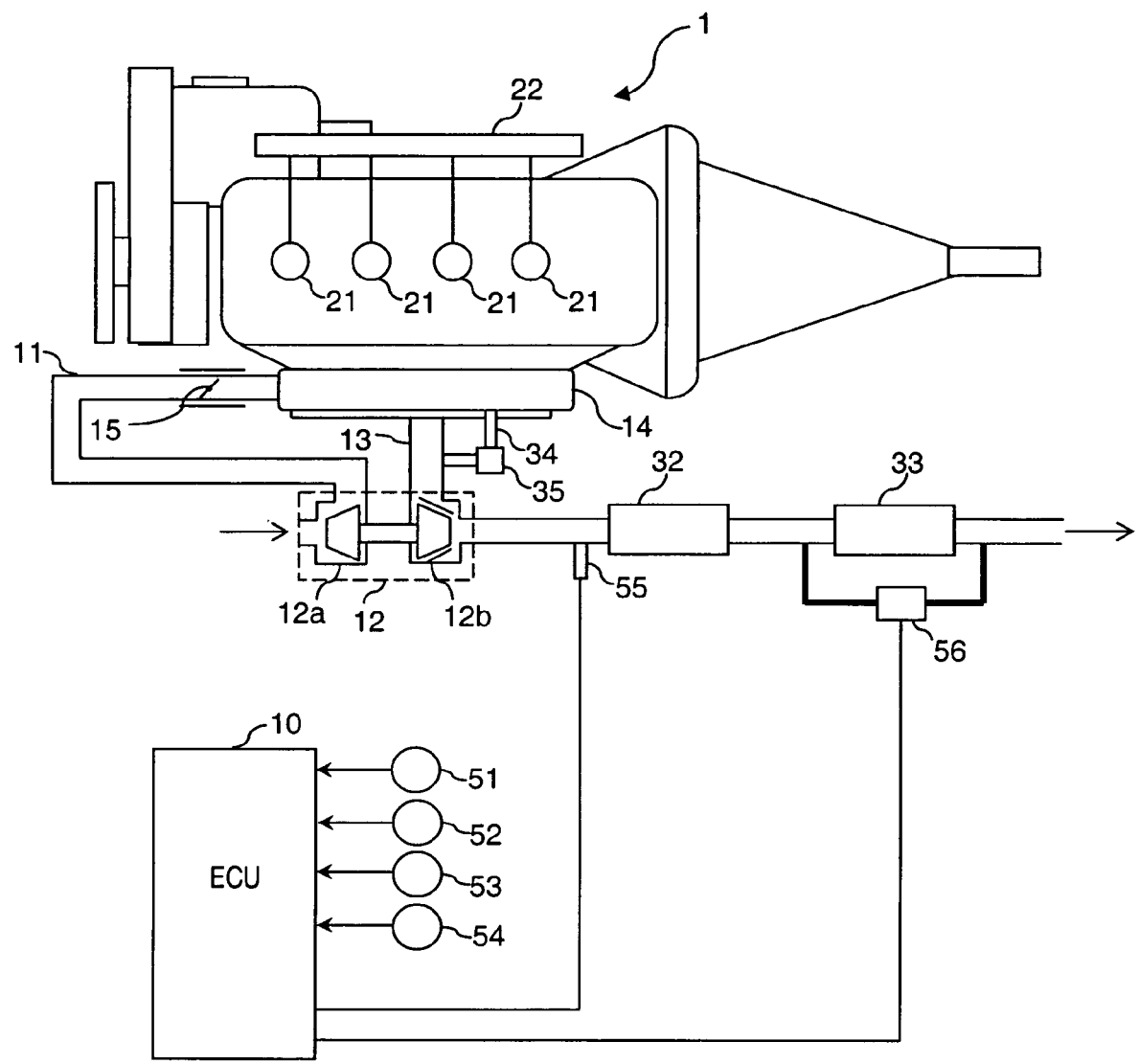
FIG. 1 is a schematic illustration of an engine equipped with an electronic control unit in accordance with one embodiment of the present invention.

Referring initially to FIG. 1, a diesel automobile engine 1 is illustrated that is equipped with an engine fuel injection control system in accordance with a first embodiment of the present invention. In this embodiment, the engine 1 is a direct fuel injection engine. The engine fuel injection control system includes an electronic control unit (ECU) 10 that is configured and arranged to serve as an engine controller. The electronic control unit 10 will be discussed in greater detail below.

The engine 1 is further equipped with an air cleaner (not shown) is mounted to an inlet portion of an air intake passage 11 to remove dust and particles from the intake air. A variable nozzle turbocharger 12 is operatively coupled to the diesel engine 1. The turbocharger 12 includes a compressor part 12*a* installed in the air intake passage 11 downstream of the air cleaner and a turbine part 12*b* installed in an exhaust passage 13 downstream of a manifold section. The compressor part 12*a* serves to compress the intake air delivered to the cylinders. In particular, the intake air that has passed through the air cleaner is compressed by the compressor part 12*a* and fed onward to a surge tank 14, where the intake air is distributed to the individual cylinders by a manifold section of the diesel engine 1. The turbine part 12*b* is driven by the exhaust gas and thereby turns the compressor 12*a*. The supercharging pressure of the turbocharger 12 is controlled by the electronic control unit 10 in accordance with the engine operating state of the engine. In particular, the electronic control unit 10 controls an injection nozzle opening formed on the exhaust gas inlet section of the turbine part 12*b* by controlling the angle of movable vanes provided on the turbine part 12*b*. The angle of the movable vanes is controlled by signals issued from the electronic control unit 10 in accordance with the engine operating state. When the movable vanes are driven in the open direction, the nozzle opening widens and the rotational speed of the turbine part 12*b* decreases, thereby causing the supercharging pressure of the turbocharger 12 to decrease. When the movable vanes are driven in the close direction, the nozzle opening narrows and the rotational speed of the turbine 12*b* increases, thereby causing the supercharging pressure of the turbocharger 12 to increase.

The engine 1 is also preferably equipped with a common rail fuel injection device having a plurality of fuel injection nozzles or injectors 21 and an accumulator or common rail 22. The injectors 21, one for each cylinder, are installed on the cylinder head of the engine main body. In this common rail fuel injection device, after fuel is pressurized by a high pressure fuel pump (not shown), the fuel is fed through a high-pressure fuel supply passageway such that the fuel accumulates in the common rail 22. The fuel is then distributed from this common rail 22 to the injectors 21. The injectors 21 are controlled by signals from the electronic control unit 10. Thus, the fuel is supplied to the injectors 21 from the common rail 22 and injected into the combustion chambers from the injectors 21. The pressure of the fuel inside the common rail 22 (hereinafter called the "rail pressure") is controlled to a prescribed pressure in accordance with the operating state of the engine 1.

The control unit 10 is configured to control the opening and closing of the nozzles of each of the injectors 21 to inject fuel into the engine cylinders. The fuel pressure inside the common rail 22 is variably adjusted by a pressure regulator (not shown) and a fuel pressure sensor is provided in the common rail 22 for detecting the fuel pressure. The fuel pressure sensor is configured and arranged to output a fuel pressure signal that is indicative of the rail pressure in the common rail 22 and that is received by the control unit 10.

The exhaust system of the engine 1 also includes a NOx trapping catalytic converter 32 that is configured to treat NOx in the exhaust passage 13 on the downstream side of the turbine part 12*b*. This NOx trapping catalytic converter 32 is configured and arranged to adsorb NOx when the exhaust air-fuel ratio of the exhaust flowing into the NOx trapping catalytic converter 32 is lean that is higher than the stoichiometric air-fuel ratio. Thus, the oxygen density of the exhaust flowing into the NOx trapping catalytic converter 32 drops. Conversely, when an oxygen concentration of the exhaust gas decreases such that the exhaust flowing into the NOx trapping catalytic converter 32 has a rich air-fuel ratio that is lower than the stoichiometric air-fuel ratio, then the NOx trapping catalytic converter 32 releases the adsorbed NOx and cleans the exhaust gas by catalytic action so as to perform a purification process. In other words, during the release of the trapped NOx, the NOx is cleaned by hydrocarbons and other deoxidizing components contained in the exhaust gas.

The exhaust system of the engine 1 also includes a diesel particulate filter 33 is provided downstream of the turbine part 12*b* and the NOx trapping catalytic converter 32 to after-treat the exhaust gas. The particulates in the exhaust gas are removed from the exhaust gas as the exhaust gas passes through the diesel particulate filter 33. Thus, the diesel particulate filter 33 is provided with a porous filter element that serves to filter the exhaust gas and remove particulates from the exhaust gas.

An EGR pipe 34 for recirculating exhaust gas (EGR) is connected between the exhaust passage 13 and the air intake passage 11 (i.e., the surge tank 14 in this embodiment). An EGR control valve 35 is installed in the EGR pipe 34 to control the flow rate of the recirculated exhaust gas. An appropriate amount of exhaust gas is recirculated to the air intake passage 11 in accordance with the opening degree of the EGR control valve 35, which operates in response to an EGR control signal from the electronic control unit 21. The EGR pipe 34 and EGR valve 35 constitute an EGR section or device.

The engine 1 is further provided with a plurality of sensors, including but not limited to, an air flow meter 51, an accelerator sensor 52, a crank angle sensor 53, a vehicle speed sensor 54, an air-fuel ratio sensor 55 and a pressure difference sensor 56. The engine 1 is provided with an air flow meter 51 is configured and arranged to the flow rate of the intake air. The accelerator sensor 52 is configured and arranged to the amount by which the driver is depressing the accelerator. The crank angle sensor 53 is configured and arranged to detect a unit crank angle and a reference crank angle. The vehicle speed sensor 54 is configured and arranged to detect the speed of the vehicle. The air-fuel ratio sensor 55 is configured and arranged to detect the air-fuel ratio of the exhaust. The pressure difference sensor 56 is configured and arranged to detect the pressure difference across the diesel particulate filter 33. The signals from these sensors 51–56 are fed to the electronic control unit 10.

The electronic control unit 10 calculates the rotational speed of the engine based on the signal received from the crank angle sensor 53. The electronic control unit 10 sets the fuel injection quantity based on such engine operating conditions as the accelerator depression amount and the engine speed and sends operation command values based on the set fuel injection quantity to the injectors 21.

The electronic control unit 10 preferably includes a microcomputer with a control program that controls the fuel injectors 21 as discussed below. The electronic control unit 10 can also include other conventional components such as an input interface circuit, an output interface circuit, and storage devices such as a ROM (Read Only Memory) device and a RAM (Random Access Memory) device. The microcomputer of the electronic control unit 10 is programmed to control the fuel injectors 21. The memory circuit stores processing results and control programs are run by the processor circuit. The electronic control unit 10 is operatively coupled to the sensors 51–56 in a conventional manner. The internal RAM of the electronic control unit 10 stores statuses of operational flags and various control data. The internal ROM of the electronic control unit 10 stores various operations as needed and/or desired. It will be apparent to those skilled in the art from this disclosure that the precise structure and algorithms for electronic control unit 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In this embodiment, the operating states of the NOx trapping catalytic converter 32 and/or the diesel particulate filter 33 are determined and the mode of controlling the fuel injection is changed in accordance with the determined states. More particularly, in this embodiment, an intake air throttle valve 15 is provided upstream of the surge tank 14 and when the amount of NOx trapped in the NOx trapping catalytic converter 32 reaches an upper limit, the opening of the intake air throttle valve 15 is closed by a prescribed amount in order to regenerate the NOx trapping catalytic converter. The excess air ratio is thereby lowered to a valve less than a value equivalent to the stoichiometric air-fuel ratio and the fuel injection quantity is increased to a value larger than normal in order to achieve the same torque. Meanwhile, when the amount of particulates accumulated in the diesel particulate filter 33 reaches an upper limit, the fuel injection timing is retarded and the excess air ratio is increased to a value slightly higher than a value equivalent to the stoichiometric air-fuel ratio in order to regenerate the diesel particulate filter 33.

Figure 2:
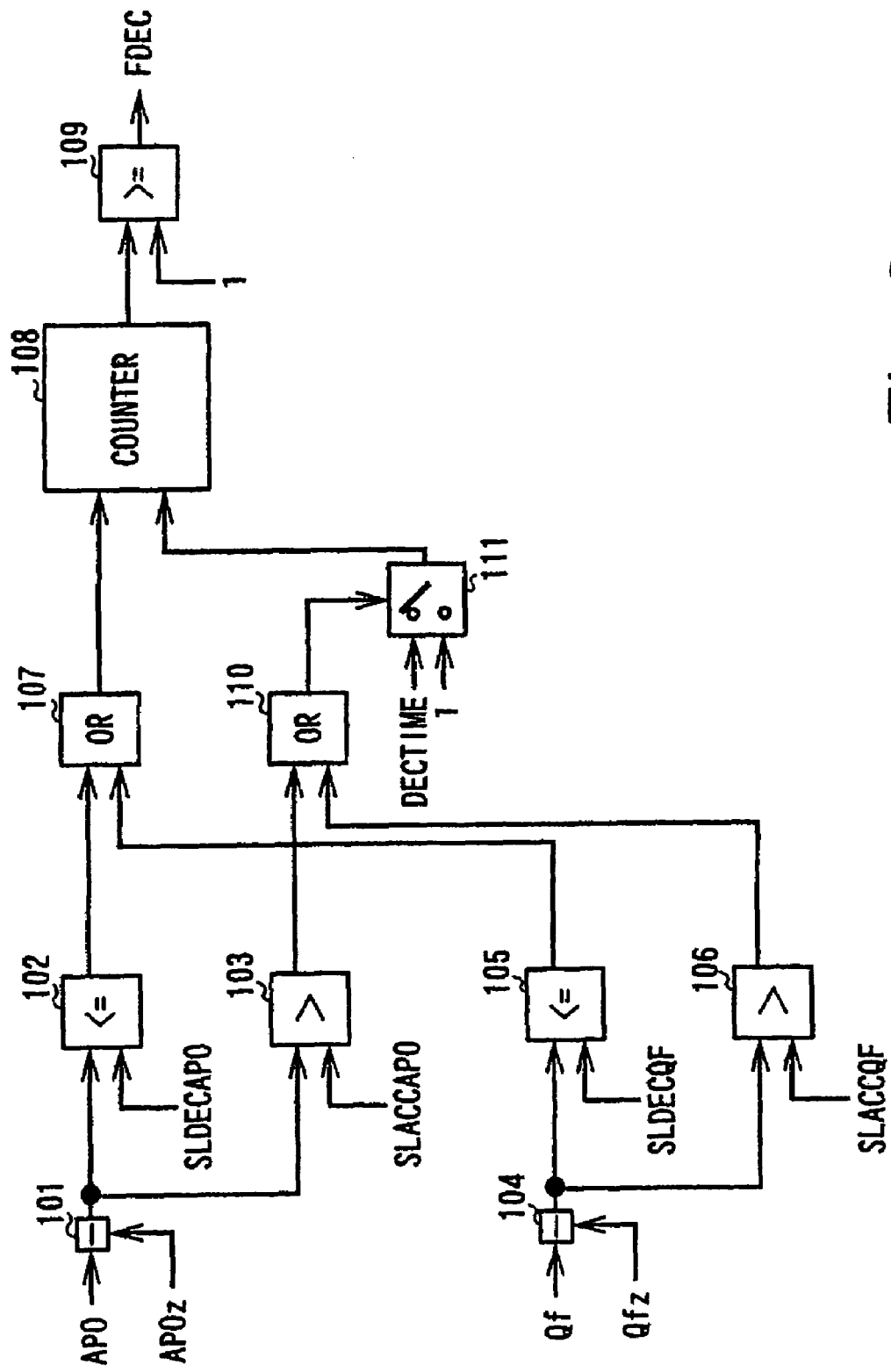
FIG. 2 is a functional block diagram illustrating an operating state detecting section of an electronic control unit in accordance with the first embodiment.

The constituent features and operation of the electronic control unit 10 will now be described with reference to FIG. 2. FIG. 2 shows the constituent features of the engine operating state detecting section of the electronic control unit 10. The engine operating state detecting section determines if the engine 1 is in a prescribed engine operating state in which the fuel injection quantity should be reduced by a prescribed amount. If the engine is in the prescribed engine operating state, the electronic control unit 10 sets a flag FDEC to a value of 1 for a prescribed period of time. The flag FDEC is normally set to 0.

With the present invention, when the fuel injection quantity decreases, the EGR quantity is reduced to curb the decrease in the compressor flow rate and the rotational speed of the turbine part 12b is reduced to decrease the supercharging pressure. As a result, the minimum allowable value of the compressor flow rate can be reduced. Thus, surging can be prevented using existing equipment without adding special components and without incurring such undesirable secondary effects as leaking lubricating oil. Additionally, the present invention can achieve an aggressive effect against the backflow of intake air through the EGR pipe 34 when it closes the EGR valve 35 to reduce the EGR quantity.

A subtraction section 101 receives the accelerator depression amount APO and the accelerator depression amount APOz detected in the previous control cycle and calculates the difference DLTAPO (i.e., DLTAPO=APO−APOz) between the current accelerator depression amount APO and the prior accelerator depression amount APOz. A comparison section 102 compares the difference DLTAPO with a prescribed value SLDECAPO and outputs a value of 1, if the difference DLTAPO is less than or equal to the prescribed value SLDECAPO and outputs a value of 0 if the difference DLTAPO is greater than the prescribed value SLDECAPO. The prescribed value SLDECAPO is used for determining if the vehicle is decelerating and is set to a value less than 0. In other words, the comparison section 102 determines if the vehicle is decelerating (which indicates that the fuel injection quantity is likely to be decreasing) based on the difference DLTAPO and outputs a value of 1 if it determines that the vehicle is decelerating.

A comparison section 103 compares the difference DLTAPO with a prescribed value SLACCAPO and outputs a value of 1 if the difference DLTAPO is greater than the prescribed value SLACCAPO and outputs a value of 0 if the difference DLTAPO is less than or equal to the prescribed value SLACCAPO. The prescribed value SLACCAPO is used for determining if the vehicle is accelerating and is set to a value greater than 0. In other words, the comparison section 103 determines if the vehicle is accelerating (which indicates that the fuel injection quantity is increasing) based on the difference DLTAPO and outputs a value of 1 if it determines that the vehicle is accelerating.

Meanwhile, the subtraction section 104 receives the fuel injection quantity Qf and the fuel injection quantity Qfz calculated in the previous control cycle and calculates the difference DLTQF (i.e., DLTQF=Qf−Qfz) between the two. The fuel injection quantity Qf mentioned in this embodiment is a basic fuel injection quantity Qf0 based on the engine operating state of the engine or the sum of the basic fuel injection quantity Qf0 and an idle compensation quantity.

A comparison section 105 compares the difference DLTQF with a prescribed value SLDECQF and outputs a value of 1 if the difference DLTQF is less than or equal to the prescribed value SLDECQF and outputs a value of 0 if the difference DLTQF is greater than the prescribed value SLDECQF. The prescribed value SLDECQF is for determining if the fuel injection quantity is decreasing and is set to a value less than 0.

A comparison section 106 compares the difference DLTQF with a prescribed value SLACCQF and outputs a value of 1 if the difference DLTQF is greater the prescribed value SLACCQF and a value of 0 if the difference DLTQF is less than or equal the prescribed value SLDECQF. The prescribed value SLACCQF is used for determining if the fuel injection quantity is increasing and is set to a value greater than 0.

An OR circuit 107 starts a counter 108 when the output value of either of the comparison sections 102 and 105 is 1. The counter 108 receives either the value 1 or a prescribed value DECTIME depending on the output of a subsequent OR circuit 110. Starting with a counter value CNT equal to the prescribed value DECTIME, the counter 108 decrements the counter value CNT by 1 each control cycle. The value of the flag FDEC is set to 1 until the value of the counter value CNT after decrementing reaches 1 (comparison section 109).

The OR circuit 110 normally outputs the prescribed value DECTIME to the switch section 111. The OR circuit 110 outputs the value 1 only when either of the comparison sections 103 and 106 has an output value of 1, in which case the counter value CNT of the counter 108 reaches 1 immediately.

Figure 3:
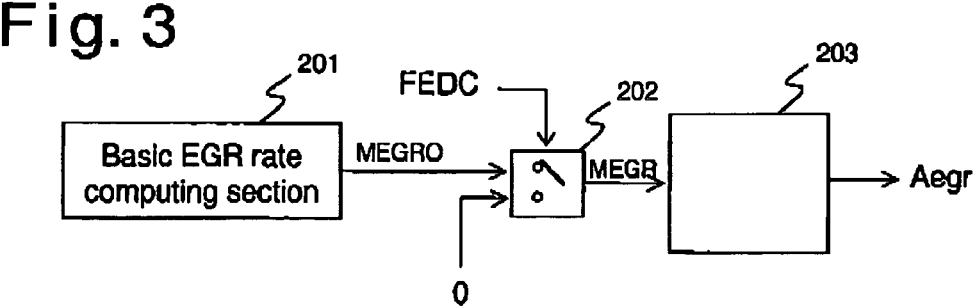
FIG. 3 is a functional block diagram illustrating an EGR control section of the electronic control unit in accordance with the first embodiment.

Although in this embodiment the prescribed value DECTIME is a constant, it is also acceptable to vary the value based on the operating state (e.g., the vehicle speed). FIG. 3 shows the constituent features of the EGR control section.

A basic EGR rate computing section 201 calculates a basic EGR rate MEGR0 based on such operating conditions as the accelerator depression amount APO and the engine rotational speed Ne. The computation of the basic EGR rate MEGR0 is accomplished by searching a map that allocates a basic EGR rate based on the accelerator depression amount APO and the engine rotational speed Ne. The basic EGR rate MEGR0 is calculated in such a manner that a larger value is obtained when the accelerator depression amount APO is smaller and the engine rotational speed Ne is lower.

The switch section 202 receives the flag FDEC and switches the target EGR ratio MEGR in accordance with the value of the flag FDEC. In short, the switch section 202 outputs the basic EGR rate MEGR0 as the target EGR rate MEFR when the value of the flag FDEC is set to 0 and outputs the value 1 when the value of the flag FDEC is set to 1.

The EGR valve opening computing section 203 calculates the EGR valve opening degree Aegr of the EGR valve 35 in accordance with the target EGR rate MEGR. The calculation is accomplished by converting the target EGR rate MEGR into a flow rate Qegr of the EGR gas per unit time based on the intake air flow rate Qafm (obtained from the air flow meter 51) and calculating the EGR valve opening degree Aegr by dividing the flowrate Qegr by the flow speed Cegr of the EGR gas. The flow speed Cegr is estimated based on the exhaust gas flow rate Qexh and the turbine nozzle opening degree Trav.

Figure 4:
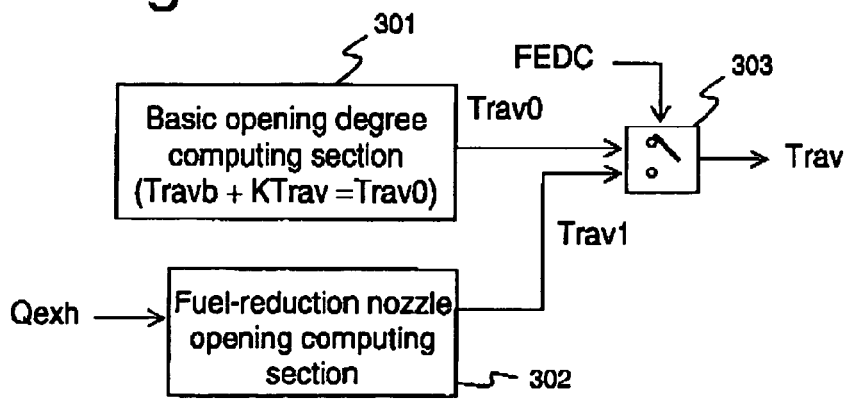
FIG. 4 is a functional block diagram illustrating a supercharging control section of the electronic control unit in accordance with the first embodiment.

FIG. 4 shows the constituent features of the supercharging control section. A basic opening degree computing section 301 calculates a basic value Trav0 of the turbine nozzle opening degree (hereinafter called basic turbine nozzle opening degree Trav0) based on the engine speed Ne, the target EGR rate MEGR and the exhaust pressure. The computation of the basic nozzle opening degree Trav0 is accomplished by adding a compensation factor KTrav based on the exhaust pressure (substituted with the fuel injection quantity Qf0 in this embodiment) to a basic factor Travb based on the engine rotational speed Ne and the target EGR rate MEGR. The basic factor Travb is calculated in such a manner that a smaller value is obtained when the engine speed is lower and the target EGR rate MEGR is higher. The compensation factor Trav is calculated in such a manner that a larger value is obtained when the fuel injection quantity Qf0 is larger.

Figure 6:
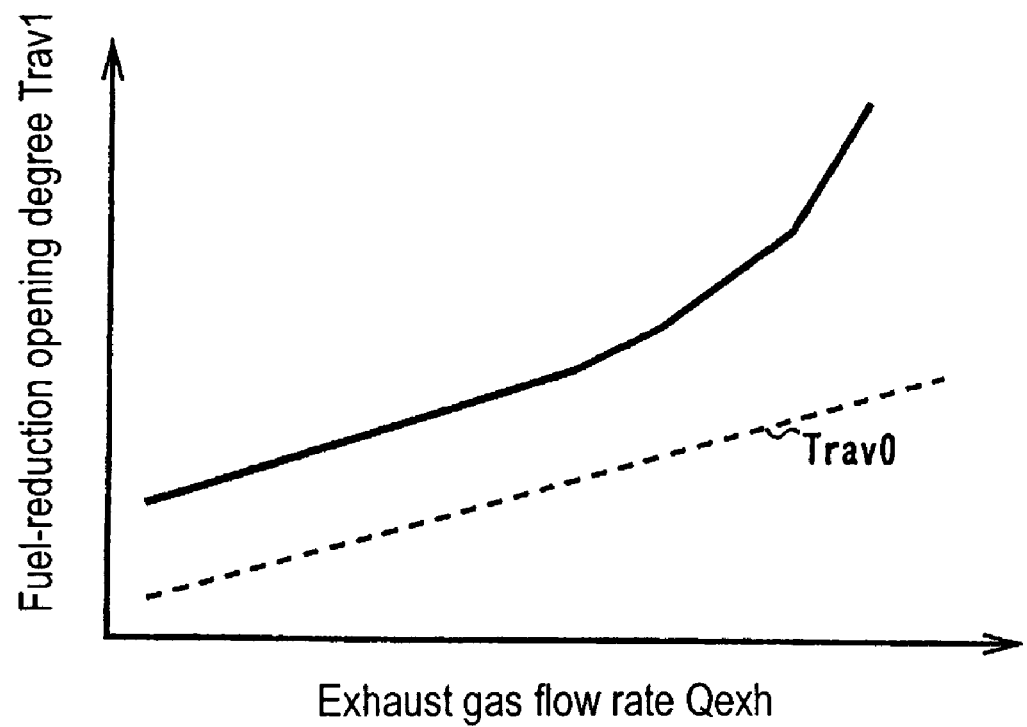
FIG. 6 is a map of the exhaust gas flow rate versus of the fuel-reduction nozzle opening degree.

The fuel-reduction nozzle opening computing section 302 calculates the turbine nozzle opening degree Trav1 to be used when the fuel injection quantity is reduced (hereinafter called fuel-reduction nozzle opening degree Trav1). The computation of the fuel-reduction nozzle opening degree Trav1 is accomplished by searching the table shown in FIG. 6 using the exhaust gas flow rate Qexh. The fuel-reduction nozzle opening degree Trav1 is calculated in such a manner as to be a larger value than the normal turbine nozzle opening degree (i.e., the basic nozzle opening degree Trav0) for a given exhaust gas flow rate Qexh and in such a manner that the larger the exhaust gas flow rate Qexh is, the larger the value obtained for the fuel-reduction nozzle opening degree Trav1. The exhaust gas flow rate Qexh can be calculated by calculating the EGR flow rate Qegr and the cylinder intake air flow rate Qcyl as a quantity per unit time, calculating the increase in flow rate resulting from the fuel, and adding these flow rates together. The cylinder intake air flow rate Qcyl is calculated by applying a compensation calculation to the flow rate Qafm obtained from the air flow meter 51 to compensate for the delay of the air flowing into the cylinder.

The switch section 303 receives the Flag FDEC and switches the target nozzle opening degree Trav in accordance with the value of the FDEC. The switch section 303 outputs the basic nozzle opening degree Trav0 as the target nozzle opening degree when the flag FDEC has a value of 0 and the fuel-reduction nozzle opening degree Trav1 when the flag FDEC has a value of 1.

Figure 5:
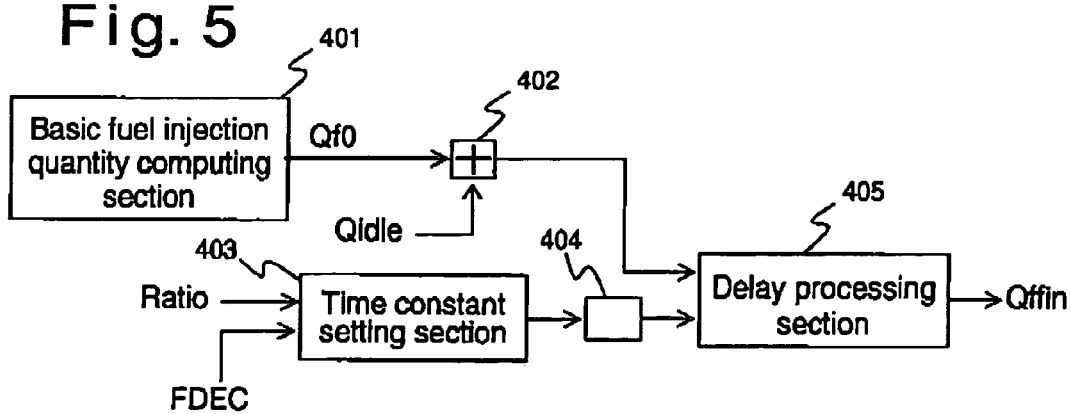
FIG. 5 is functional block diagram illustrating a fuel injection control section of the electronic control unit in accordance with the first embodiment.

FIG. 5 shows the constituent features of the fuel injection control section. A basic injection quantity computing section 401 receives such engine operating conditions as the accelerator depression amount APO and the engine rotational speed Ne and also the detected states of the NOx trapping catalytic converter 32 and the diesel particulate filter 33. Based on this information, it calculates a basic injection quantity Qf0. The basic injection quantity Qf0 is normally calculated based on the operating conditions using a map that allocates a basic injection quantity in accordance with the accelerator depression amount and the engine rotational speed Ne. The map is configured such that for a given engine speed Ne, the basic injection quantity Qf0 is set to a larger value when the accelerator depression amount APO is larger. The basic injection quantity Qf0 is also calculated to a larger value than normal when either of the exhaust gas cleaning devices is being regenerated. More specifically, the basic injection quantity Qf0 is calculated in such a manner as to achieve an excess air ratio less than 1 when the NOx trapping catalyst 32 is being regenerated and an excess air ratio slightly higher than 1 when the diesel particulate filter 33 is being regenerated.

An addition section 402 adds an idle compensation quantity Qidle to the basic injection quantity Qf0 and substitutes the resulting sum as the value of the basic injection quantity Qf0 (Qf0=Qf0+Qidle).

Meanwhile, a time constant setting section 403 receives the flag FDEC and the gear ratio RATIO of the automatic transmission (not shown). When the flag FDEC has a value of 1, the time constant setting section 403 sets the time constant KTCASD based on the received gear ratio RATIO. When the flag FDEC has a value of 0, the time constant setting section 403 sets the time constant KTCASD to 0. It is also acceptable to change the time constant KTCASD depending on whether the lockup device of the automatic transmission is engaged or released. The gear ratio RATIO is the ratio between the rotational speeds of the input pulley and the output pulley of the automatic transmission A limiter 404 limits the value of the time constant KTCASD to a prescribed range. In other words, when the time constant KTCASD exceeds an upper limit value, the limiter 404 replaces the value of the time constant KTCASD with the upper limit value. Meanwhile, when the time constant KTCASD falls below a lower limit value, the limiter 404 replaces the value of the time constant KTCASD with the lower limit value.

A delay processing section 405 applies first order delay processing to the basic injection quantity Qf0 using the time constant KTCASD. More specifically, the delay processing section 405 outputs a delay-processed basic injection quantity as the final fuel injection quantity Qffin when the fuel injection quantity is decreasing and outputs the basic fuel injection quantity Qf0 as the final fuel injection quantity Qffin when the fuel injection quantity is not decreasing.

Figure 7:
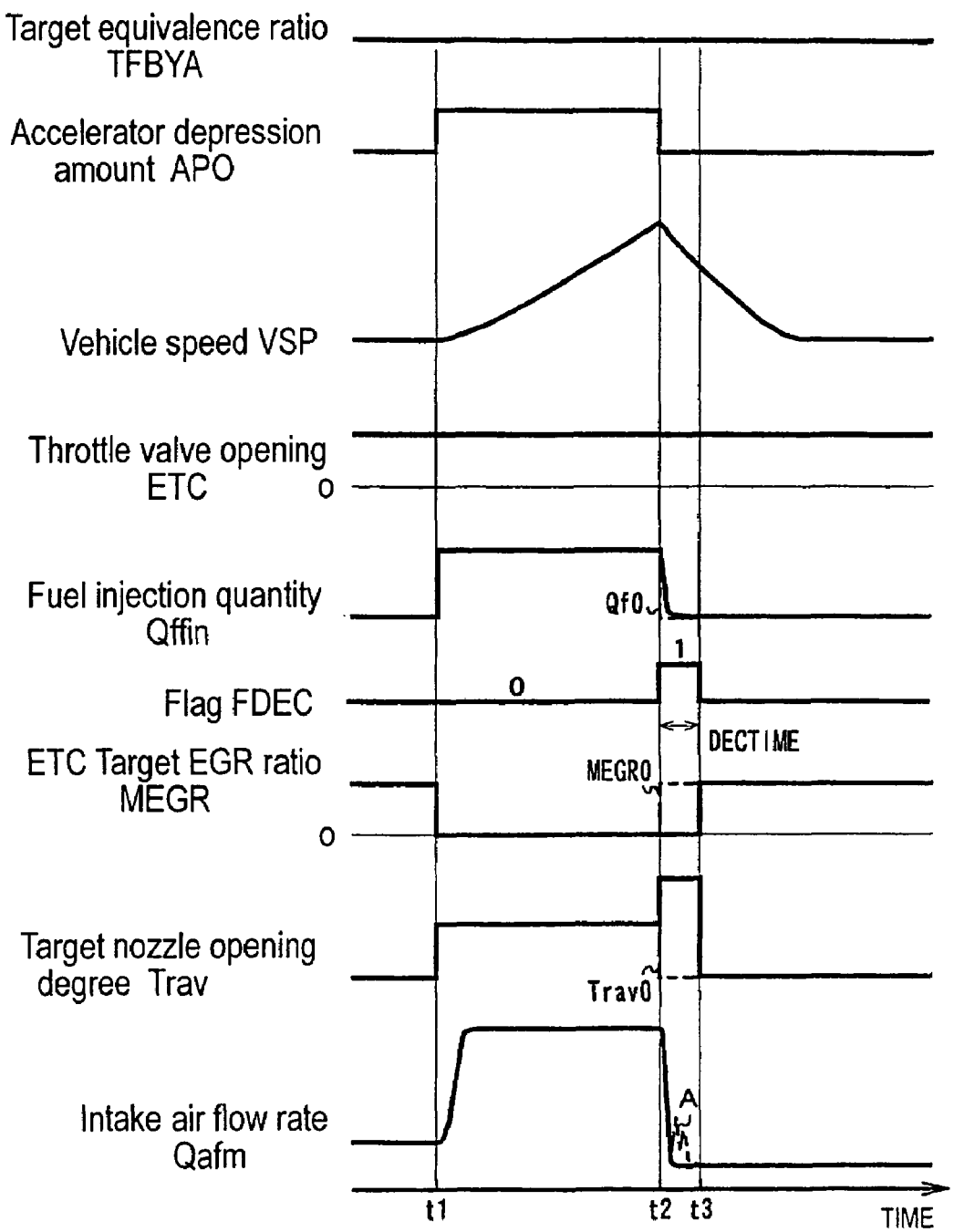
FIG. 7 is a timing chart that illustrates the operation of the electronic control unit when the vehicle decelerates.
Figure 8:
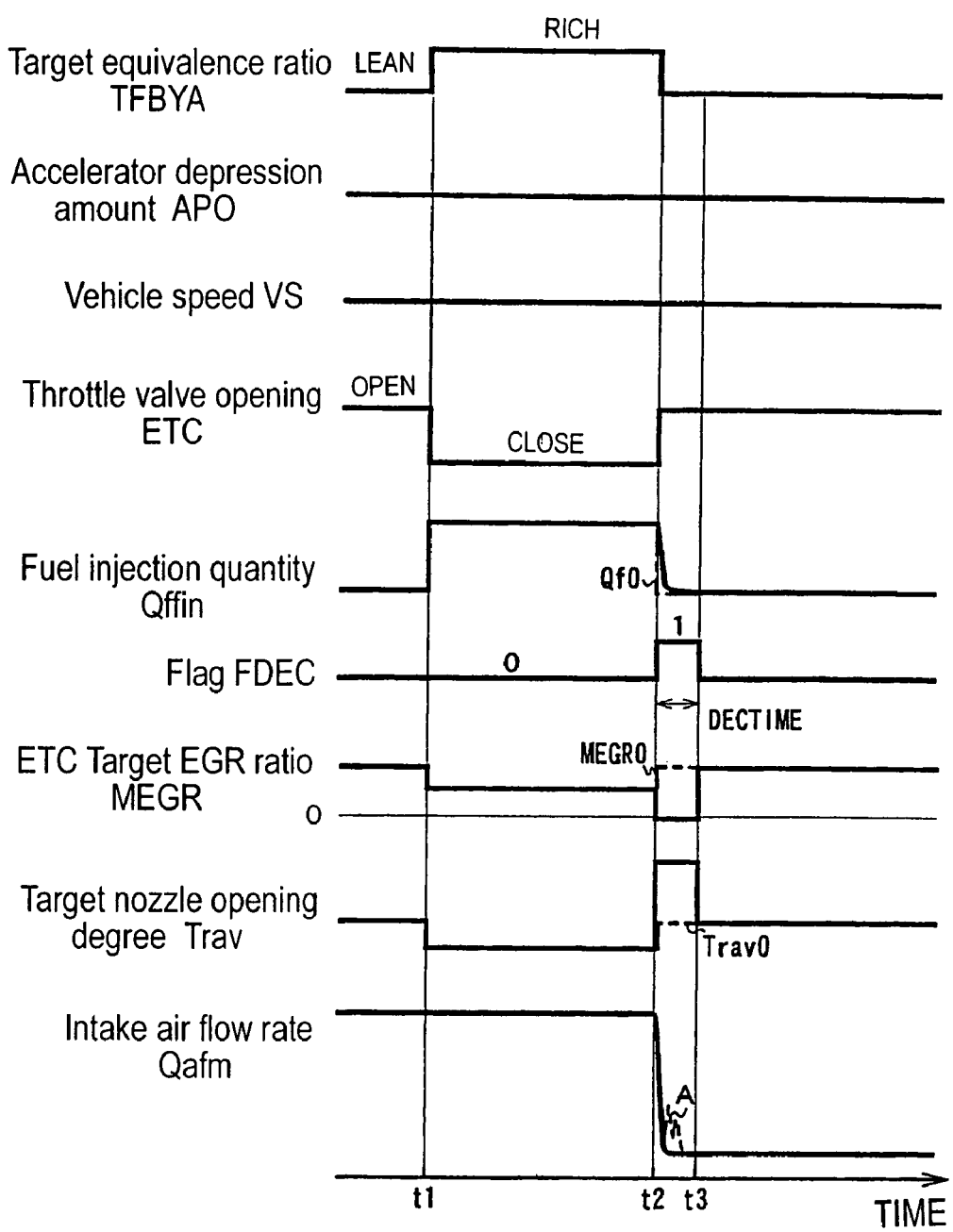
FIG. 8 is a timing chart that illustrates the operation of the electronic control unit when the fuel injection quantity is reduced after completing regeneration of the NOx trapping catalytic converter.

FIGS. 7 and 8 show time charts for the target EGR rate MEGR, the target nozzle opening degree Trav, and fuel injection quantity Qffin. FIG. 7 illustrates a case in which the vehicle is decelerating, the fuel injection quantity decreases and a constant target equivalence ratio TFBYA is used. When the accelerator pedal is depressed (time t1), the fuel injection quantity Qffin increases with the increase in accelerator pedal depression amount APO. Meanwhile, the target EGR rate MEGR is decreased and the target nozzle opening degree Trav is increased. Afterwards, when the accelerator pedal is released (time t2), the fuel injection quantity Qffin decreases with the decrease in accelerator pedal depression amount APO. The decrease in the fuel injection quantity Qffin is moderated by the time constant KTCASD. Here, if the target EGR rate MEGR and the target nozzle opening degree Trav were set in the normal fashion, the target EGR rate MEGR (=MEGR0) would increase and the target nozzle opening degree Trav (Trav0) would decrease as the accelerator depression amount APO decreases. The turbine 12b of the turbocharger 12 would rotate at a high speed and the fuel injection quantity would decrease while a somewhat high supercharging pressure was being obtained. As a result, the compressor flow rate would fall below the minimum allowable value corresponding to the rotational speed of the turbine 12b (hereinafter called simply "minimum allowable value") and surging would occur in the compressor 12a. The surging shows up in the output of the air flow meter 51 as indicated by A in the figures. In this embodiment, however, the target EGR rate MEGR is set to 0 during the period DECTIME while the flag FDEC is set to 1 when the fuel injection quantity is decreased, thus decreasing the EGR quantity. Thus, at time t3, the flag FDEC is set to 0, the target EGR rate MEGR increased and the target nozzle opening degree Trav decreases to Trav0.

Additionally, the target nozzle opening degree Trav is increased above the normal value and the rotational speed of the turbine 12b is decreased. As a result, in this embodiment, the compressor flow rate is increased by an amount corresponding to the decrease in the EGR quantity, thereby suppressing the decline in the compressor flow rate. Furthermore, by reducing the speed of the turbine 12b, the minimum allowable value is decreased and the turbocharger 12 is prevented from operating in the surge region.

FIG. 8 illustrates a case in which the fuel injection quantity is reduced after regeneration of the NOx trapping catalytic converter 32 is completed. During regeneration of the NOx trapping catalytic converter 32, the accelerator depression amount APO is substantially constant. The intake air throttle valve 15 is closed by a prescribed amount and the excess air ratio is lowered to a value less than 1. In order to keep the torque constant, the fuel injection quantity Qffin is increased (time t1). Additionally, the target EGR rate MEGR is reduced and, thus, the target nozzle opening Trav is also reduced. When the regeneration of the NOx trapping filter is finished, the intake air throttle valve 15 is opened to return the excess air ratio to its normal higher value and the fuel injection quantity Qffin is reduced (time t2). Thus, the target eqivalence ratio TFBYA changes from lean to rich after time t1. As described previously, the decrease in the fuel injection quantity Qffin is moderated by the time constant KTCASD. Here, if the target EGR rate MEGR and the target nozzle opening degree Trav were set in the normal fashion, both the target EGR rate MEGR (=MEGR0) and the target nozzle opening degree Trav (Trav0) would increase as the regeneration ends and the compressor flow rate would inevitably undergo a rapid decline, causing the compressor flow rate to fall below the minimum allowable value and surging to occur. Thus, at time t3, the flag FDEC is set to 0, the target EGR rate MEGR increased and the target nozzle opening degree Trav decreases to Trav0.

Secondly, when the fuel injection quantity is reduced, the target EGR ratio MEGR is set to 0 and the EGR valve is closed fully. As a result, backflow of intake air into the exhaust passage 13 can be prevented.

Figure 9:
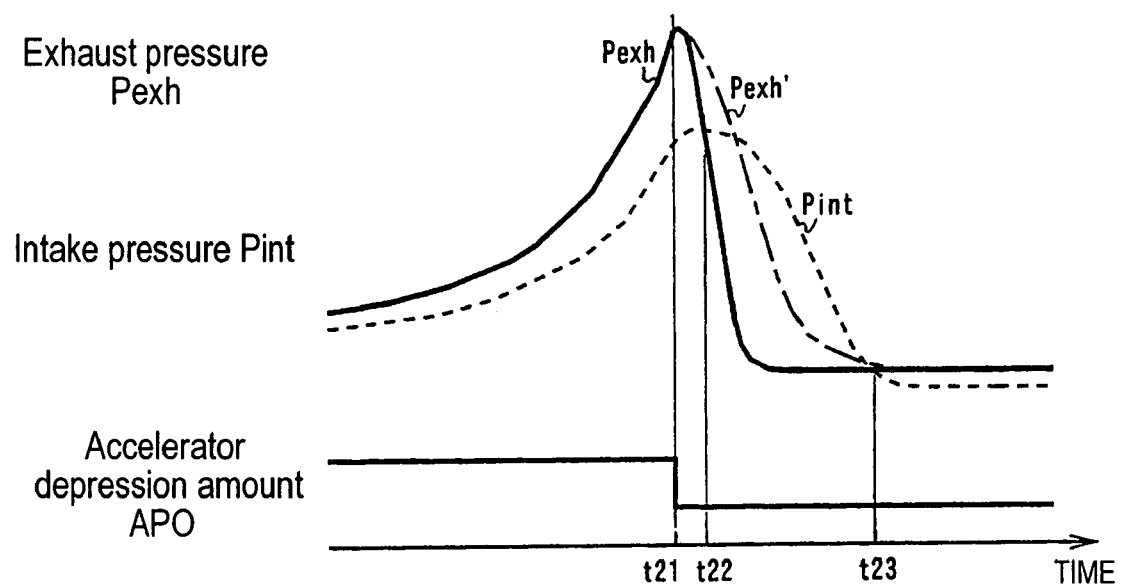
FIG. 9 is a timing chart that illustrates the change in the exhaust pressure and intake pressure when the fuel injection quantity is reduced.

FIG. 9 shows the change in the exhaust pressure Pexh and the intake pressure Pint when the fuel injection quantity decreases. In FIG. 9, time 21 indicates the time when the acceleration depression amount APO is decreased, while time t22 indicates the time when the exhaust pressure Pexh is at its maximum and time t23 indicates the time when the exhaust pressure Pexh is equal to the intake pressure Pint.

The correlation between the exhaust pressure Pexh and the fuel injection quantity is high and the exhaust pressure Pexh declines rapidly when the accelerator depression amount APO decreases. Meanwhile, the intake pressure Pint declines in a delayed fashion behind the exhaust pressure Pexh due to the supercharging effect of the turbocharger 12. Consequently, during the process of decreasing, the exhaust pressure Pexh falls below the intake pressure Pint. If the EGR valve 35 was opened in the normal fashion under such conditions, intake air would backflow through the EGR pipe 34 and into the exhaust passage 13. The intake air would then react excessively with the catalyst components of the NOx trapping catalytic converter 32 and contribute to the degradation of the NOx trapping catalytic converter 32. In this embodiment, however, the target EGR rate MEGR is set to 0 when the fuel injection quantity decreases and the EGR valve 35 is closed fully. As a result, backflow of the intake air is reliably prevented.

In this embodiment, the comparison sections 102, 105 and the OR circuit 107 (FIG. 2) constitute an engine operating state detecting section. The switch section 202 (FIG. 3) constitutes an EGR quantity control section or EGR quantity reducing section. The fuel-reduction nozzle opening computing section 302 and the switch section 303 (FIG. 4) constitute a rotational speed control section. The fuel injection control section as a whole (FIG. 5) constitutes a fuel injection quantity control section. The effects of this embodiment will now be described.

Firstly, during deceleration or when fuel injection quantity is reduced after the NOx trapping catalytic converter 32 is regenerated, the target EGR rate MEGR is reduced to a value smaller than normal, thereby reducing the EGR quantity and securing a sufficient compressor flow rate. Also, the target nozzle opening degree Trav is increased to a value larger than normal, thereby decreasing the speed of the turbine 12b and reducing the minimum allowable value. As a result, the present invention makes it possible to prevent surging using existing equipment without adding special components.

Secondly, when the fuel injection quantity is reduced, the target EGR ratio MEGR is set to 0 and the EGR valve is closed fully. As a result, backflow of intake air into the exhaust passage 11 can be prevented.

Thirdly, when the fuel injection quantity is reduced, the change in the fuel injection quantity Qffin is moderated. As a result, abrupt reductions in the compressor flow rate can be prevented and surging can be prevented even more reliably.

Second Embodiment

Figure 10:
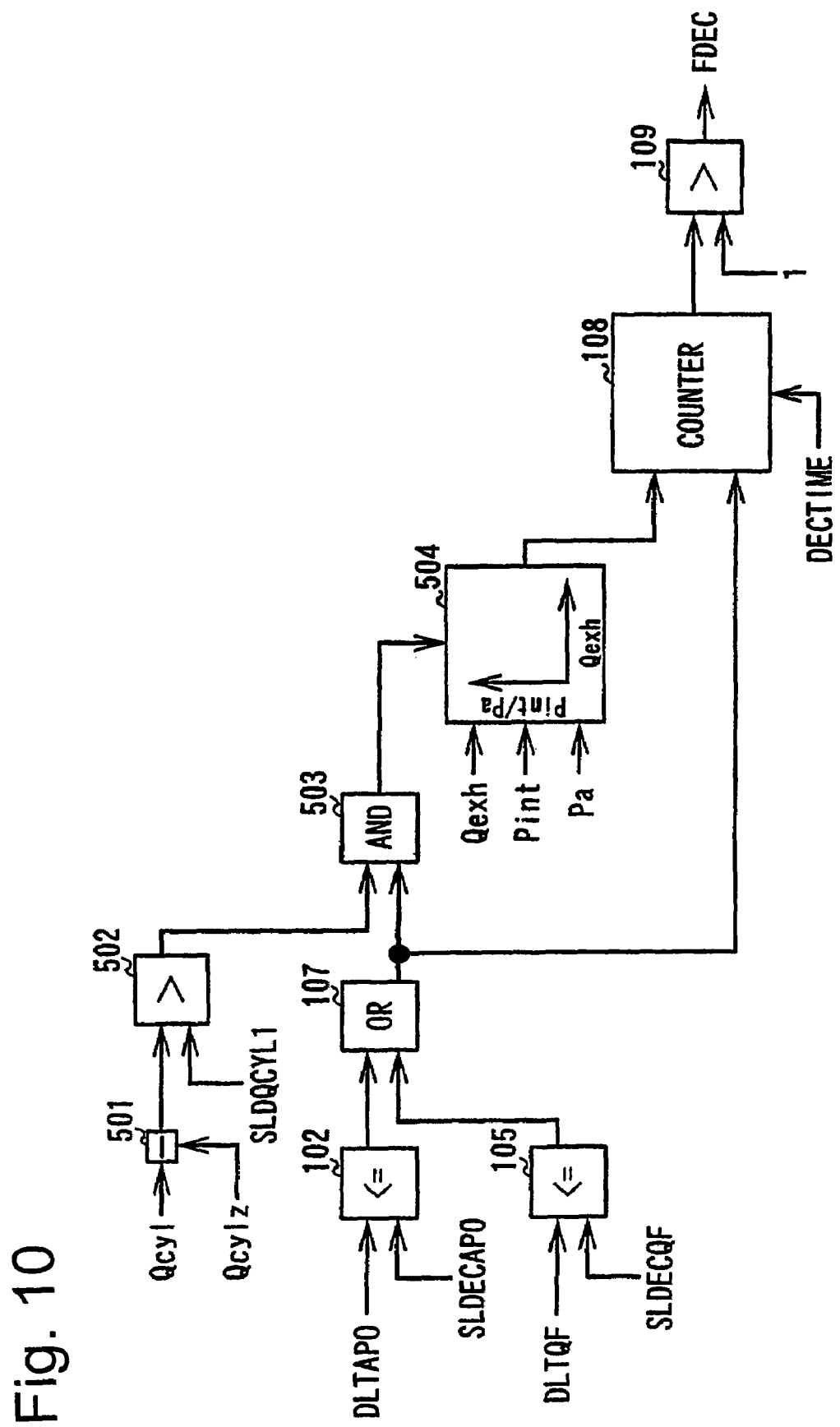
FIG. 10 is a functional block diagram illustrating an operating state detecting section in accordance with a second embodiment.

Referring now to FIG. 10, an operating state detecting section in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

A subtraction section 501 receives the cylinder intake air flow rate Qcyl and the cylinder intake air flow rate Qcylz of the previous cycle and calculates the difference DQCYL (i.e., DQCYL=Qcyl−Qcylz) between the current cylinder intake air flow rate Qcyl and the cylinder intake air flow rate Qcylz of the previous cycle.

A comparison section 502 compares the difference DQCYL with a prescribed value SLDQCYL1 and outputs a value of 1 if the difference DQCYL is greater than the prescribed value SLDQCYL1 or outputs a value of 0 if the difference DQCYL is less than or equal to the prescribed value SLDQCYL1. The prescribed value SLDQCYL1 is a value indicating the increase in the output of the air flow meter 52 resulting from surging (FIG. 7) and is set to a value greater than 0. In short, the comparison section 502 determines if surging has occurred in the compressor 12a based on the difference DQCYL and outputs the value 1 when it determines that surging has occurred.

An AND circuit 503 outputs the value 1 only when the OR circuit 107 outputs the value 1 and the comparison section 502 outputs the value 1. Otherwise, the AND circuit 503 outputs a value of 0. More specifically, the AND circuit 503 outputs a value of 1 when surging occurs while the vehicle is decelerating or while the fuel injection quantity is being decreased after completing regeneration of the NOx trapping catalytic converter 32.

An operating state storing section 504 includes an operating region map that is demarcated by the exhaust gas flow rate Qexh and the supercharging pressure (=Pint/Pa). The operating state storing section 504 is configured to store the output value of the AND circuit 503 and assign it to the region of the map corresponding to the current operating state. In other words, the operating state storing section 504 stores the value 1 with respect to the appropriate operating region when surging has occurred and stores the value 0 when surging has not occurred. The number of times it is determined that surging has occurred at a particular operating region is counted and the value 1 is stored when the number of times surging has been determined to have occurred reaches a prescribed value. In this embodiment, the supercharging pressure is expressed as the ratio of the pressure Pint inside the intake passage 11 downstream of the compressor 12a to the atmospheric pressure Pa.

The counter 108 only starts when the OR circuit 107 outputs the value 1 and the operating state storing section 504 has stored a value of 1 with respect to the current operating state. Starting with a counter value CNT equal to the prescribed value DECTIME, the counter 108 decrements the counter value CNT by 1 each control cycle. The value of the flag FDEC is set to 1 until the value of the counter value CNT after decrementing reaches 1.

In this embodiment, the comparison section 502 constitutes a surge determining section and the operation state storing section 504 constitutes the operating state storing section.

With this embodiment, the operating state storing section 504 learns the operating states where surging has occurred and only reduces the target EGR rate MEGR and increases the target nozzle opening degree Trav when the engine is operating in an operating state where surging has occurred in the past. As a result, in addition to preventing surging, this embodiment eliminates unnecessary reductions of the target EGR rate MEGR and unnecessary increases of the target nozzle opening degree Trav, thereby reducing emissions.

Third Embodiment

Figure 11:
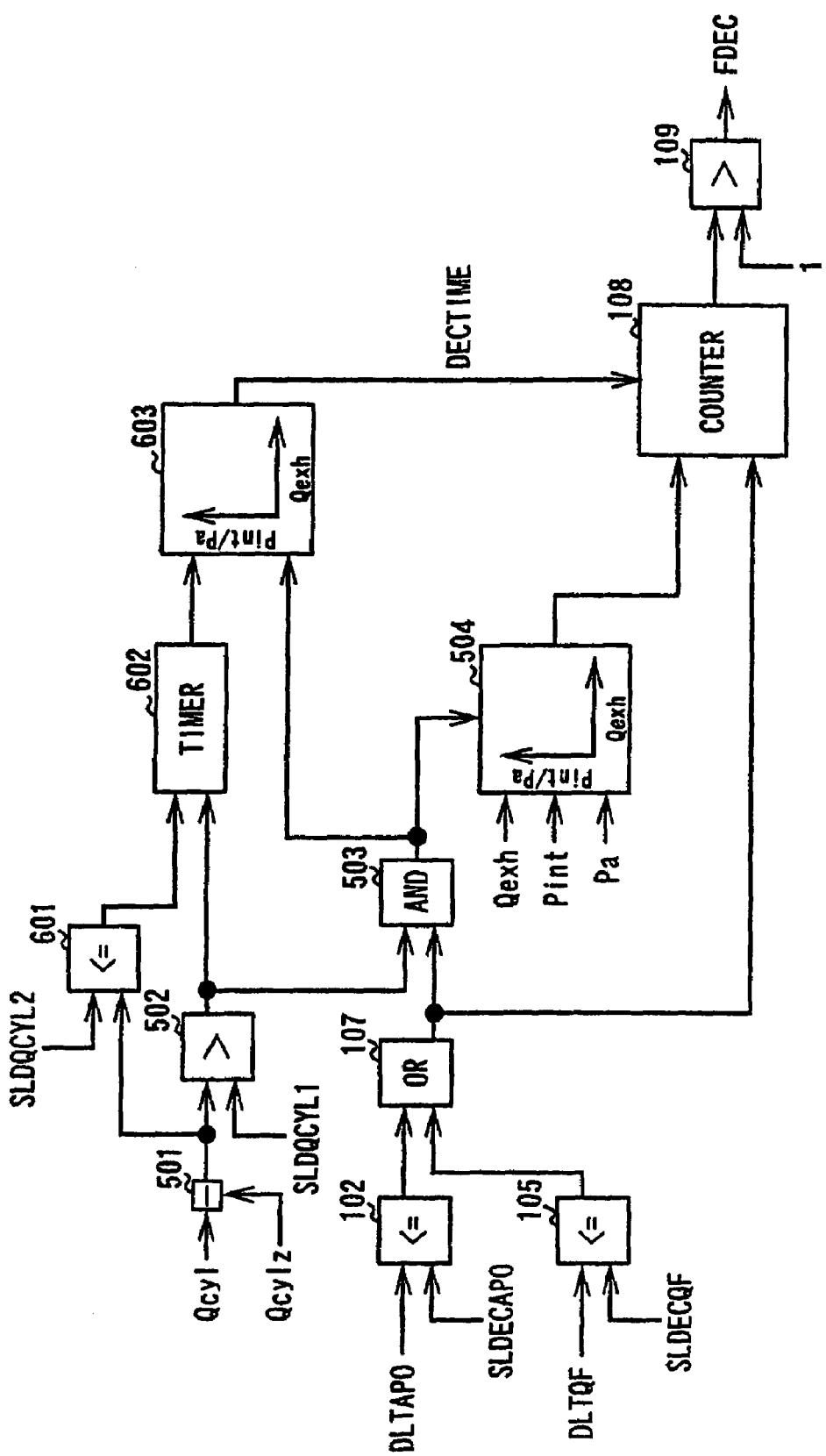
FIG. 11 is a functional block diagram illustrating an operating state detecting section in accordance with a third embodiment.

Referring now to FIG. 11, an operating state detecting section in accordance with a third embodiment will now be explained. In view of the similarity between the prior embodiments and third embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiment may be omitted for the sake of brevity.

A comparison section 601 compares the absolute value of the difference DQCYL between the cylinder intake air flow rates Qcyl and Qcylz to a prescribed value SLDQCYL2. After the output of the comparison section 502 changes to 1, the comparison section 601 outputs the value 1 when the difference DQCYL reaches the comparatively small prescribed value SLDQCYL2. The prescribed value SLDQCYL2 indicates when the surging has converged and is set to a smaller value than SLDQCYL1. In short, based on the difference DQCYL, the comparison section 601 determines if the surging that occurred in the compressor 12a has converged and outputs the value 1 when the surging has converged.

A timer section 602 starts when the comparison section 502 outputs the value 1 and stops when the comparison section 601 outputs the value 1. When it stops, the timer 602 outputs the value it had reached at the point in time when it stopped.

A time storing section 603 includes an operating region map that is demarcated by the exhaust gas flow rate Qexh and the supercharging pressure, and the time storing section 603 is configured to store the output value of the timer section 602 as the surge continuation time and assign it to the region of the map corresponding to the current operating state.

The counter 108 only starts when the OR circuit 107 outputs the value 1 and the operating state storing section 504 has stored a value of 1 with respect to the current operating state. The counter 108 receives the surge continuation time from the time storing section 603 as the prescribed value DECTIME value and the value of the flag FDEC is set to 1 for the duration of the surge continuation time.

In this embodiment, the comparison section 601 and the timer section 602 constitute the time measuring section.

With this embodiment, the amount of time over which surging continues is learned in addition to the operating states where surging has occurred. The target EGR rate MEGR is reduced and the target nozzle opening degree Trav increased only when the engine is operating in an operating state where surging has occurred in the past and the reduction and increase are executed over the learned period of time. As a result, this embodiment is capable of optimizing the period of time during which the target EGR rate MEGR is decreased and the target nozzle opening degree Trav is increased irregardless of individual differences between turbochargers 1.

As used herein to describe the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method of controlling an engine comprising:
    detecting if an engine with a turbocharger is operating in a prescribed engine operating state resulting in a fuel injection quantity being reduced by at least a prescribed amount per unit time;
    reducing an EGR quantity delivered by an EGR device to a quantity that is smaller than normal upon detecting the prescribed engine operating state; and
    reducing a rotational speed of a turbine of the turbocharger to a speed that is lower than normal upon detecting the prescribed engine operating state.

2. The method as recited in claim 1, wherein
    the detecting of the prescribed engine operating state includes detecting vehicle deceleration to indicate the prescribed engine operating state.

3. The method as recited in claim 1, wherein
    the detecting of the prescribed engine operating state includes detecting that an accelerator depression amount is substantially constant and that an intake air throttle valve that is controlled independently of the accelerator depression amount has been driven from a close direction towards an open direction to indicate the prescribed engine operating state.

4. The method as recited in claim 3, wherein
    the detecting of the prescribed engine operating state includes detecting when the engine returns to normal operation with a lean air-fuel mixture after operating in a regeneration mode in which a NOx trapped in a NOx trapping catalytic converter is released to indicate the prescribed engine operating state.

5. An engine control device comprising:
    engine operating state detecting means for detecting if an engine with a turbocharger is operating in a prescribed engine operating state resulting in a fuel injection quantity being reduced by at least a prescribed amount per unit time;
    EGR quantity control means for reducing an EGR quantity delivered by an EGR device to a quantity that is smaller than normal upon detecting the prescribed engine operating state; and
    rotational speed control means for reducing a rotational speed of a turbine of the turbocharger to a speed that is lower than normal upon detecting the prescribed engine operating state.

6. An engine control device comprising:
    an engine operating state detecting section configured to detect if an engine with a turbocharger is operating in a prescribed engine operating state resulting in a fuel injection quantity being reduced by at least a prescribed amount per unit time;
    an EGR quantity control section configured to reduce an EGR quantity delivered by an EGR device to a quantity that is smaller than normal upon detecting the prescribed engine operating state; and
    a rotational speed control section configured to reduce a rotational speed of a turbine of the turbocharger to a speed that is lower than normal upon detecting the prescribed engine operating state.

7. The engine control device as recited in claim 6, wherein
    the engine operating state detecting section is further configured to detect the prescribed engine operating state by detecting vehicle deceleration.

8. The engine control device as recited in claim 6, wherein
    the engine operating state detecting section is configured to detect the prescribed engine operating state by detecting that an accelerator depression amount is substantially constant and that an intake air throttle valve that is controlled independently of the accelerator depression amount has been driven from a close direction towards an open direction.

9. The engine control device as recited in claim 8, wherein the engine operating state detecting section is further configured to detect the prescribed engine operating state by detecting when the engine returns to normal operation with a lean air-fuel mixture after operating in a regeneration mode in which a NOx trapped in a NOx trapping catalytic converter is released.

10. The engine control device as recited in claim 6, further comprising
a fuel injection quantity control section is configured to control a quantity of fuel injected into the engine,
the fuel injection quantity control section being configured such that upon detecting the prescribed engine operating state and that the fuel injection quantity has changed in relation to the prescribed engine operating state, then the fuel injection quantity control section applies a prescribed delay to changing the fuel injection quantity before setting a final fuel injection quantity.

11. The engine control device as recited in claim 6, wherein
the EGR quantity control section is configured to close an EGR valve completely upon detecting the prescribed engine operating state.

12. The engine control device as recited in claim 6, wherein
the rotational speed control section is configured to control the rotational speed of the turbine by increasing a nozzle opening of the turbine of the turbocharger to an opening size that is larger than normal upon detecting the prescribed engine operating.

13. The engine control device as recited in claim 6, further comprising
a surge determining section configured to determine if surging has occurred upon detecting the prescribed engine operating state; and
an operating state storing section configured to store a detected engine operating state as a surging operating state that is indicative of that surging is occurring,
the EGR quantity control section and the rotational speed control section being configured to reduce an EGR quantity and lower the rotational speed of the turbine only upon detecting the prescribed engine operating state and the engine is in the surging operating state stored in the operating state storing section.

14. The engine control device as recited in claim 13, further comprising
a time measuring section configured to measure an amount of time over which the surging continues upon determining that the surging has occurred,
the EGR quantity control section and the rotational speed control section being configured to reduce the EGR quantity and lower the rotational speed of the turbine during a period from when the prescribed engine operating state has been detected until when a measured amount of time elapses.

15. The engine control device as recited in claim 9, further comprising
a fuel injection quantity control section is configured to control a quantity of fuel injected into the engine,
the fuel injection quantity control section being configured such that upon detecting the prescribed engine operating state and that the fuel injection quantity has changed in relation to the prescribed engine operating state, then the fuel injection quantity control section applies a prescribed delay to changing the fuel injection quantity before setting a final fuel injection quantity.

16. The engine control device as recited in claim 15, wherein
the EGR quantity control section is configured to close an EGR valve completely upon detecting the prescribed engine operating state.

17. The engine control device as recited in claim 16, wherein
the rotational speed control section is configured to control the rotational speed of the turbine by increasing a nozzle opening of the turbine of the turbocharger to an opening size that is larger than normal upon detecting the prescribed engine operating.

18. The engine control device as recited in claim 17, further comprising
a surge determining section configured to determine if surging has occurred upon detecting the prescribed engine operating state; and
an operating state storing section configured to store a detected engine operating state as a surging operating state that is indicative of that surging is occurring,
the EGR quantity control section and the rotational speed control section being configured to reduce an EGR quantity and lower the rotational speed of the turbine only upon detecting the prescribed engine operating state and the engine is in the surging operating state stored in the operating state storing section.

19. The engine control device as recited in claim 18, further comprising
a time measuring section configured to measure an amount of time over which the surging continues upon determining that the surging has occurred,
the EGR quantity control section and the rotational speed control section being configured to reduce the EGR quantity and lower the rotational speed of the turbine during a period from when the prescribed engine operating state has been detected until when a measured amount of time elapses.

\* \* \* \* \*